United States Patent
Cowan et al.

(10) Patent No.: US 8,205,454 B2
(45) Date of Patent: Jun. 26, 2012

(54) CONVERGENT DIVERGENT NOZZLE WITH EDGE COOLED DIVERGENT SEALS

(75) Inventors: Curtis C. Cowan, East Hampton, CT (US); James P. Allore, Manchester, CT (US); Paul Attridge, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 1775 days.

(21) Appl. No.: 11/671,591

(22) Filed: Feb. 6, 2007

(65) Prior Publication Data

US 2009/0072490 A1    Mar. 19, 2009

(51) Int. Cl.
F02K 1/00 (2006.01)
B05B 12/00 (2006.01)

(52) U.S. Cl. .................. 60/771; 239/265.39; 277/930

(58) Field of Classification Search .............. 60/770, 60/771; 239/265.39; 277/411, 412, 930 277/654
See application file for complete search history.

(56) References Cited

U.S. PATENT DOCUMENTS

| | | | |
|---|---|---|---|
| 4,203,286 A | 5/1980 | Warburton |
| 4,643,356 A | 2/1987 | Holler et al. |
| 4,718,230 A | 1/1988 | Honeycutt, Jr. et al. |
| 4,747,542 A | 5/1988 | Cires et al. |
| 4,747,543 A | 5/1988 | Madden |
| 5,000,386 A | 3/1991 | Lybarger |
| 5,060,472 A | 10/1991 | Schirtzinger |
| 5,067,324 A | 11/1991 | Beytes et al. |
| 5,076,496 A | 12/1991 | Lippmeier |
| 5,080,284 A | 1/1992 | Cires |
| 5,111,992 A | 5/1992 | Barcza |
| 5,131,222 A | 7/1992 | Auxier et al. |
| 5,141,154 A | 8/1992 | Barcza |
| 5,188,292 A | 2/1993 | Frey et al. |
| 5,209,059 A | 5/1993 | Ward |
| 5,215,256 A | 6/1993 | Barcza |
| 5,239,815 A | 8/1993 | Barcza |
| 5,239,823 A | 8/1993 | Sims |
| 5,249,419 A | 10/1993 | Landhuis |
| 5,255,849 A | 10/1993 | Mayer et al. |
| 5,269,467 A | 12/1993 | Williams et al. |
| 5,364,029 A | 11/1994 | Barcza |
| 5,437,411 A | 8/1995 | Renggli |
| 5,522,546 A | 6/1996 | Jarvis |
| 5,524,438 A | 6/1996 | Johnson et al. |
| 5,560,198 A | 10/1996 | Brewer et al. |
| 5,586,431 A | 12/1996 | Thonebe et al. |
| 5,683,034 A | 11/1997 | Johnson et al. |
| 5,775,589 A | 7/1998 | Vdoviak et al. |
| 5,794,851 A | 8/1998 | Barcza |
| 5,797,544 A | 8/1998 | Ward |

(Continued)

*Primary Examiner* — Ehud Gartenberg
*Assistant Examiner* — Young Choi
(74) *Attorney, Agent, or Firm* — Carlson Gaskey & Olds, P.C.

(57) ABSTRACT

A nozzle system includes a multitude of circumferentially distributed divergent seals that circumscribe an engine centerline. Each divergent seal includes a multiple of divergent seal intakes adjacent to a joint structure to receive cooling airflow. Each divergent seal body is manufactured of a metallic hot sheet inner skin and a metallic cold sheet outer skin. The skins form a multiple of longitudinal channels which communicate with a multiple of edge channels formed within the first longitudinal side and the second longitudinal side of each divergent seal. The multiple of edge channels are located transverse to the longitudinal axis and are raked aft to facilitate cooling of the gas path surface of each divergent seal and adjacent divergent flaps.

29 Claims, 14 Drawing Sheets

U.S. PATENT DOCUMENTS

| | | |
|---|---|---|
| 5,799,874 A | 9/1998 | Eigenbrode et al. |
| 5,813,611 A | 9/1998 | Cires et al. |
| 5,833,139 A | 11/1998 | Sondee et al. |
| 5,839,663 A | 11/1998 | Broadway et al. |
| 6,142,416 A | 11/2000 | Markstein et al. |
| 6,301,877 B1 | 10/2001 | Liang et al. |
| 6,347,510 B1 | 2/2002 | McAlice et al. |
| 6,398,129 B1 | 6/2002 | Johnson |
| 6,607,355 B2 | 8/2003 | Cunha et al. |
| 6,993,914 B2 * | 2/2006 | Prouteau et al. ............... 60/771 |
| 7,032,835 B2 * | 4/2006 | Murphy et al. ............... 239/128 |
| 7,377,099 B2 * | 5/2008 | Cowan et al. ............... 60/230 |
| 7,624,579 B2 * | 12/2009 | Peters ............... 60/771 |
| 2006/0266016 A1 * | 11/2006 | Cowan et al. ............... 60/266 |
| 2007/0186555 A1 * | 8/2007 | Peters ............... 60/770 |

* cited by examiner

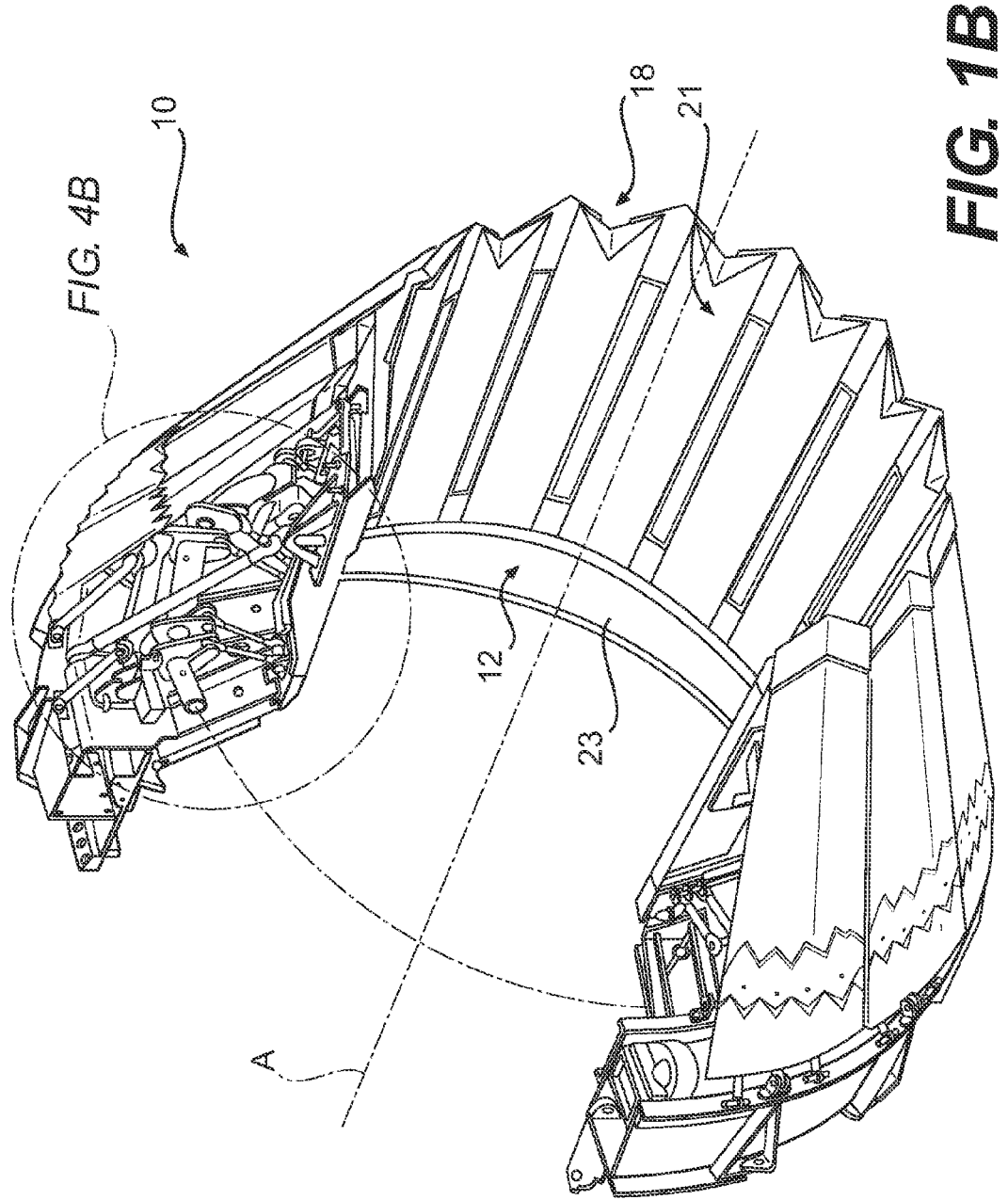

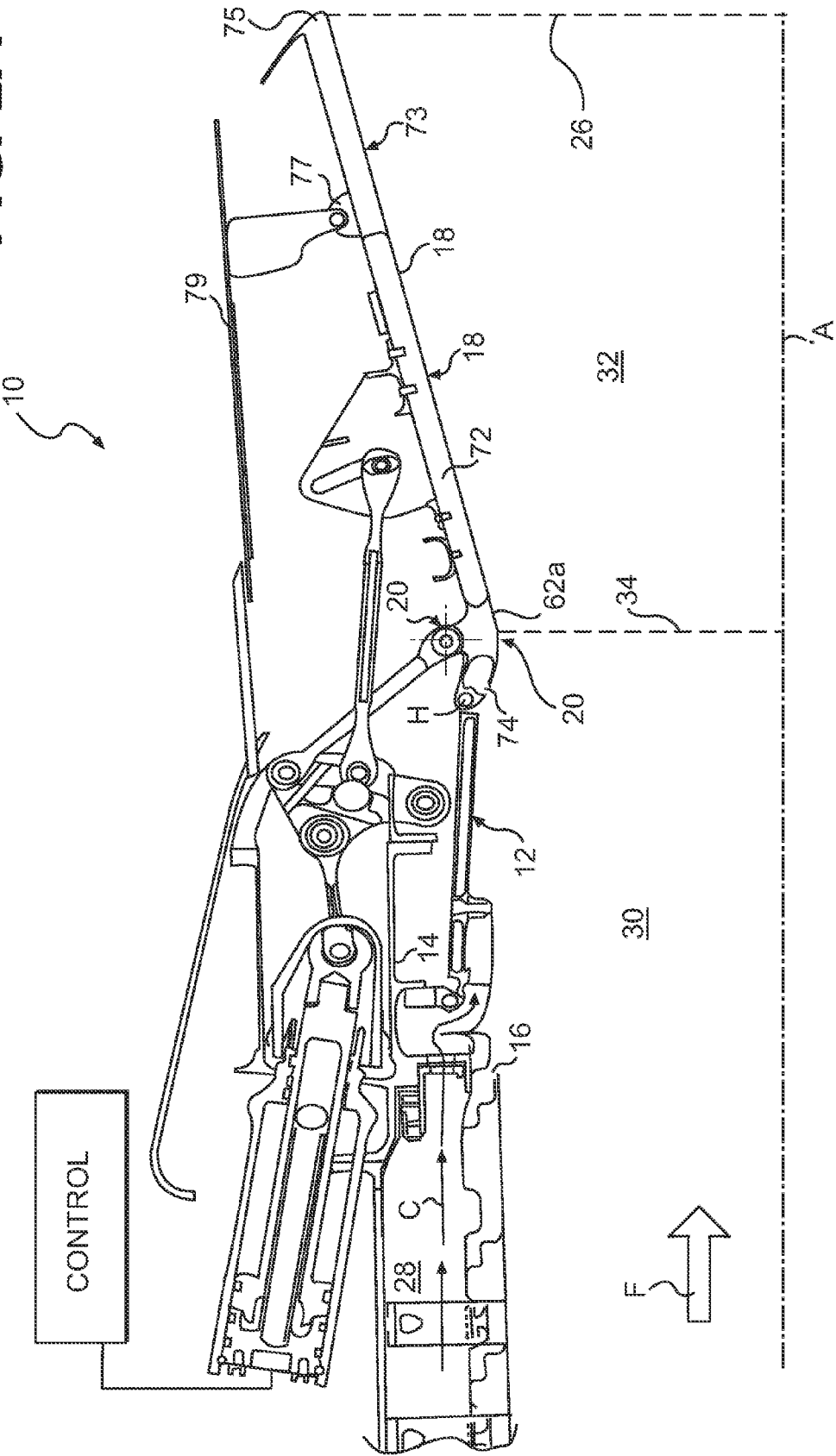

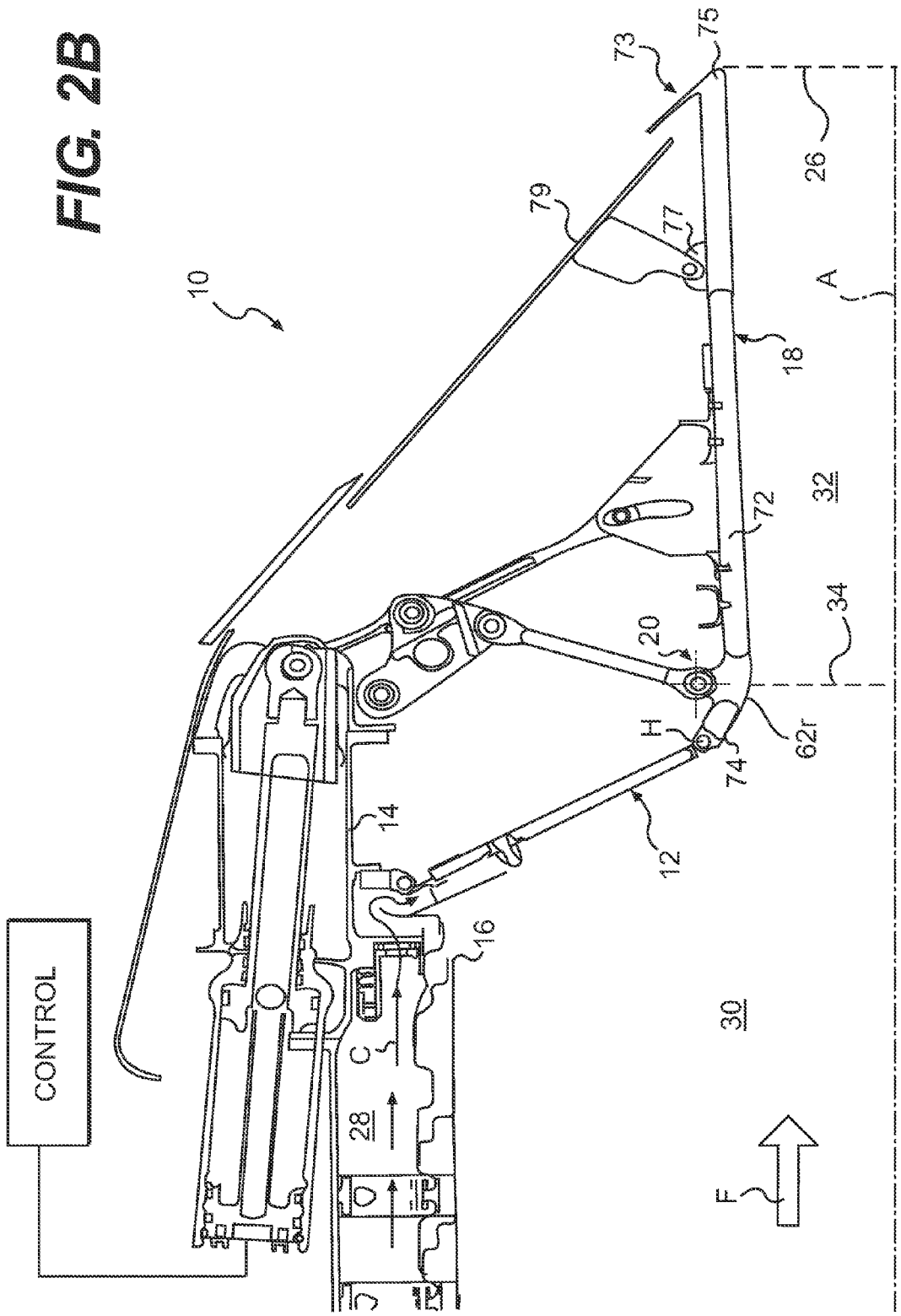

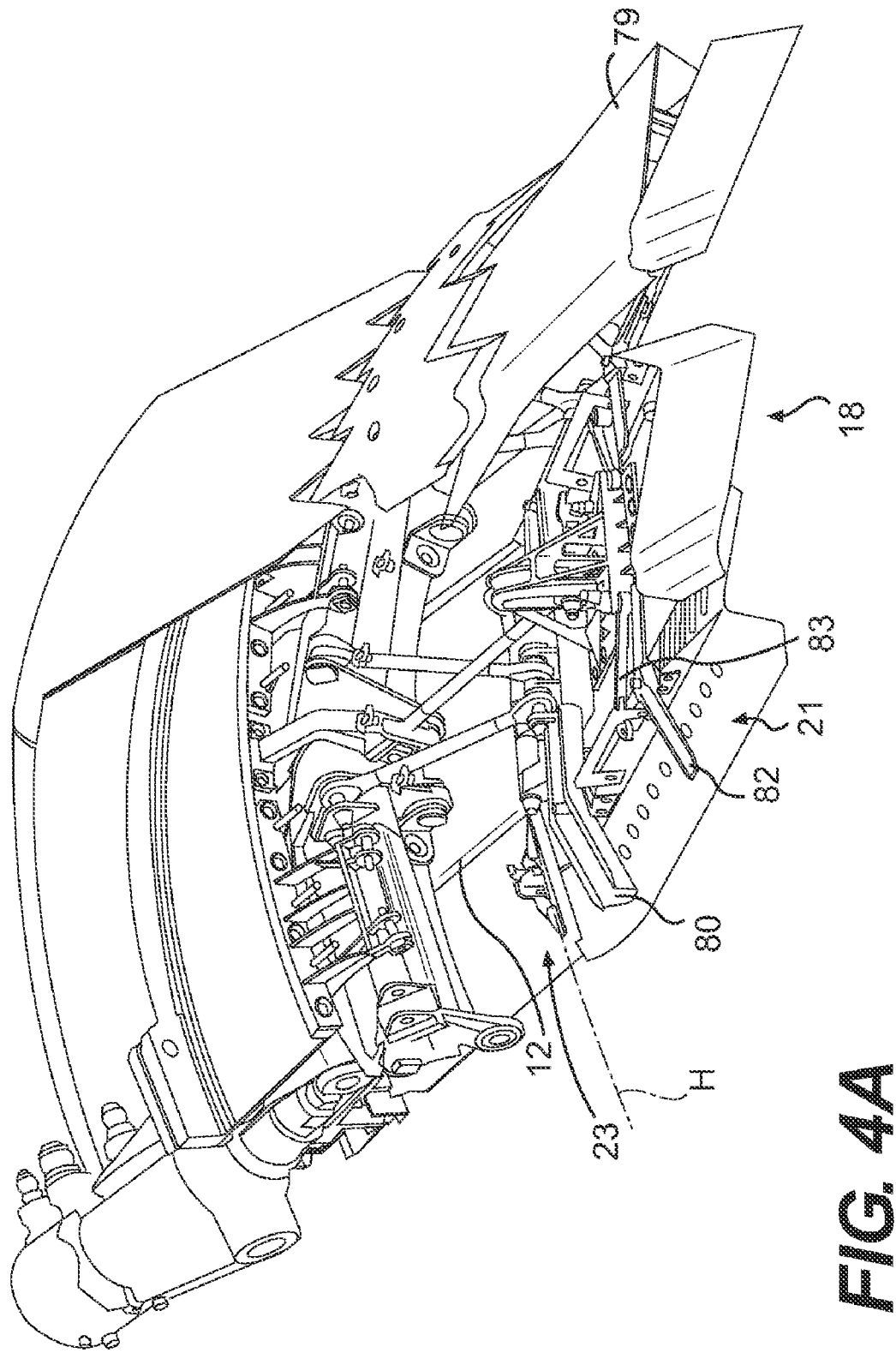

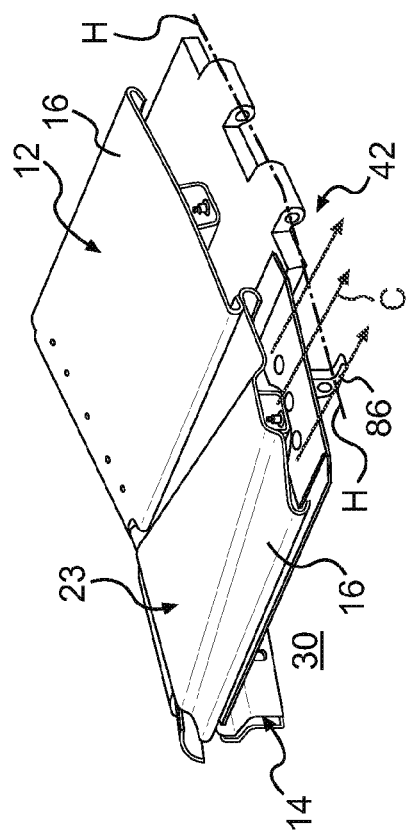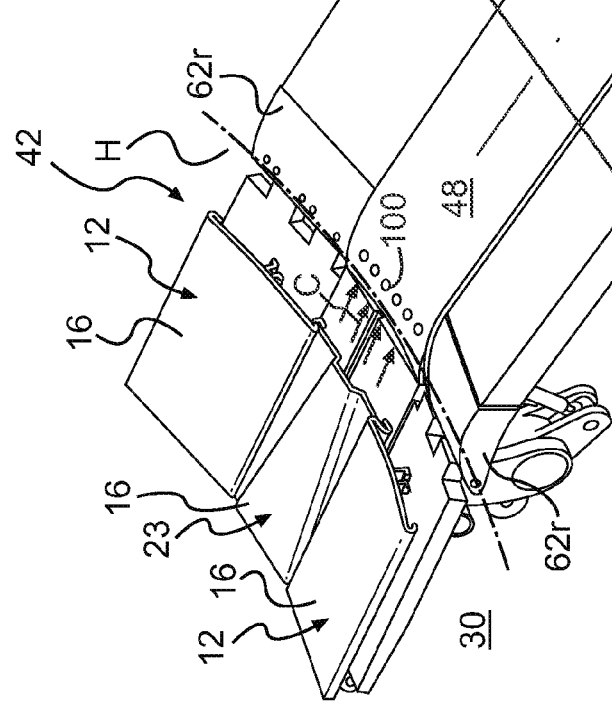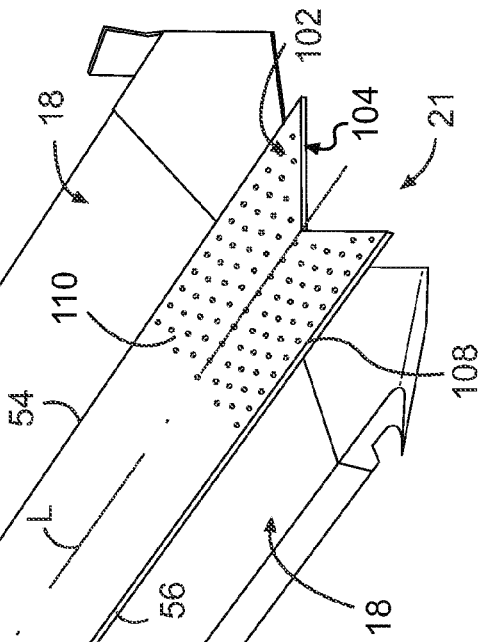

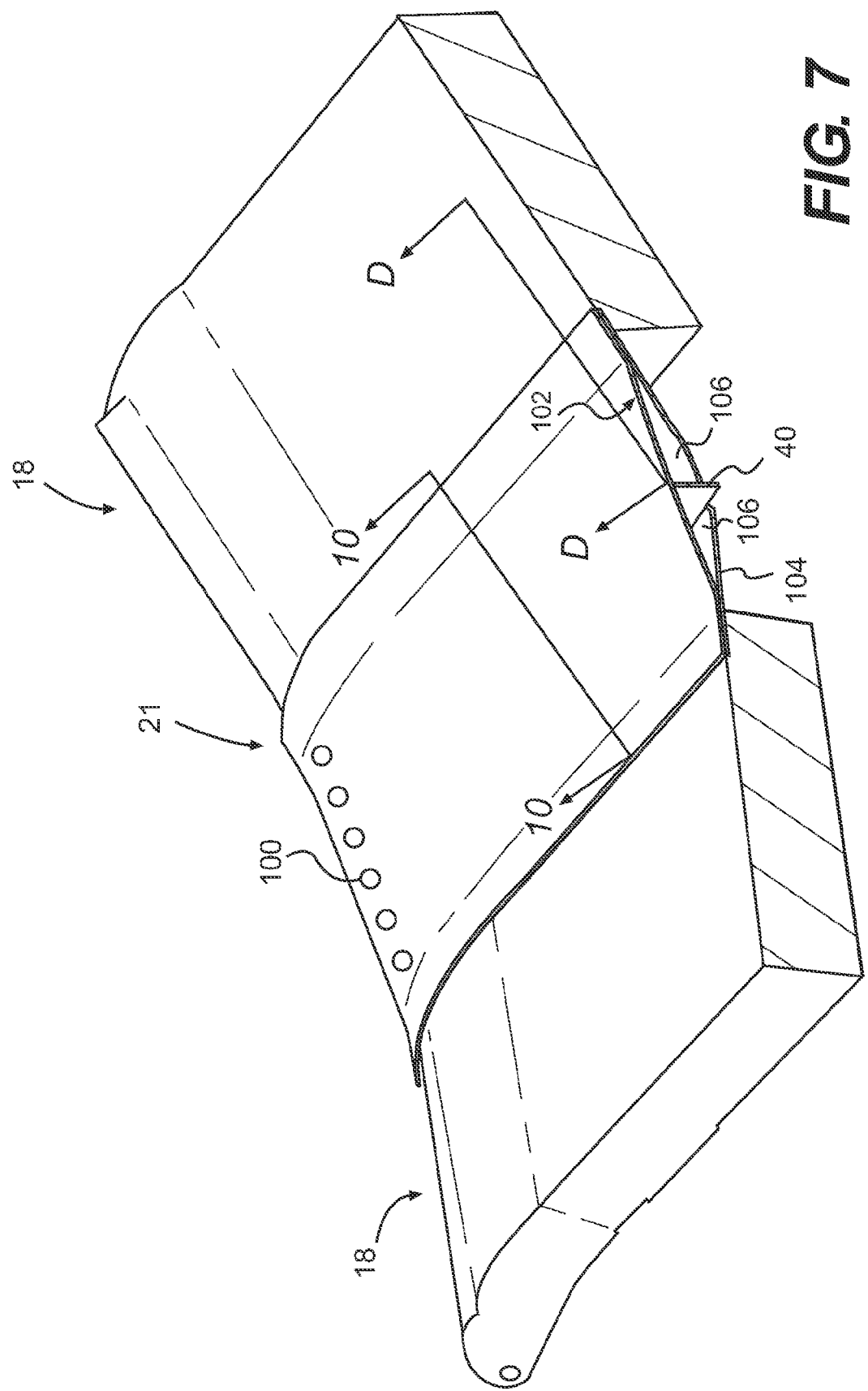

CONVERGENT DIVERGENT NOZZLE WITH EDGE COOLED DIVERGENT SEALS

This invention was made with government support under Contract No. N00019-02-C-3003 with the Department of Navy. The government therefore has certain rights in this invention.

BACKGROUND OF THE INVENTION

The present invention relates to gas turbine engines having convergent/divergent nozzles, and more particularly to a cooled divergent seal arrangement.

An exhaust nozzle optimizes the thrust produced within a gas turbine engine. In augmented gas turbine engines, convergent/divergent (C/D) nozzles provide a multitude of nozzle positions. Flaps circumferentially distributed aft of the augmentor or exhaust duct form the convergent and divergent sections for which the nozzle is named. Flap seals disposed between adjacent flaps minimize gas leakage between flaps in both sections. The convergent section is pivotally connected to the augmentor or exhaust duct and to the divergent section. The divergent section is pivotally connected to the convergent section and to an external fairing positioned radially outboard of the divergent section. The opposite end of the external fairing is pivotally attached to a static outer casing which surrounds a portion of the nozzle. Together, the outer casing, the convergent and divergent sections, and the external fairing form a nozzle plenum.

Because of the high temperature of the core gas exiting the turbine and augmentor, exhaust nozzles are cooled with air bled at lower temperature and a higher pressure than that of the exhaust gas flow passing through the nozzle system. Cooling air enters the exhaust gas path within the augmentor or exhaust duct via cooling holes in the augmentor or exhaust duct liner and subsequently passes into the nozzle system as a layer of cooling airflow along the inner surface or "hot side" of the nozzle flaps and seals. Cooling airflow within the nozzle plenum also cools the "cold side" side of the flaps and flap seals.

Accordingly, it is desirable to provide cooling of the divergent sections while efficiently utilizing the cooling air.

SUMMARY OF THE INVENTION

The nozzle system according to the present invention includes a plurality of circumferentially distributed convergent flaps, divergent flaps, convergent seals and divergent seals which circumscribe an engine centerline and define the radial outer boundary of a core gas path. The flaps and seals define a convergent section and a divergent section of the nozzle with the throat or jet area defined therebetween. Each convergent seal is pivotally connected to the stationary frame with each divergent seal pivotally connected at a joint at an aft end section of the convergent seal.

Each divergent seal includes a body, a spine member along a seal longitudinal axis, a joint structure and a flap position guide. Each divergent seal includes a multiple of divergent seal intakes in a forward end section downstream of a divergent hinge axis to receive a portion of the cooling airflow. Each divergent seal body is manufactured of a hot sheet inner skin and a cold sheet outer skin. The skins form a multiple of longitudinal channels therebetween.

The longitudinal channels communicate with a multiple of divergent seal edge channels formed within a longitudinal side or sides of each divergent seal. The multiple of edge channels are raked aft.

The cooling airflow from the longitudinal channels is communicated through the multiple of edge channels to cool the edges of the divergent seals as well as the gas path surface of the adjacent divergent flaps.

The present invention therefore provides cooling of the divergent sections while efficiently utilizing the cooling air.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1B is a general perspective view of a variable geometry exhaust nozzle of the present invention with the nozzle shown in a minimum position;

FIG. 2A is a general sectional side view of a variable geometry exhaust nozzle of the present invention with the nozzle shown in a maximum position which corresponds with FIG. 1A, the nozzle being illustrated on only one side of its centerline;

FIG. 2B is a general sectional side view of a variable geometry exhaust nozzle of the present invention with the nozzle shown in a minimum position which corresponds with FIG. 1B, the nozzle being illustrated on only one side of its centerline;

FIG. 4A is a general perspective partial phantom view of a segment of the variable geometry exhaust nozzle of the present invention with the nozzle shown in a maximum position;

FIG. 6A is a general perspective view of a convergent section from a "hot" side; and FIG. 6B is a general perspective view of a convergent section from a "hot" side at a joint to which the divergent sections attach;

FIG. 7 is a section view of the divergent seal-divergent flap interface taken along the line 7-7 in FIG. 6A;

DETAILED DESCRIPTION OF THE PREFERRED EMBODIMENT

Figure 1A:
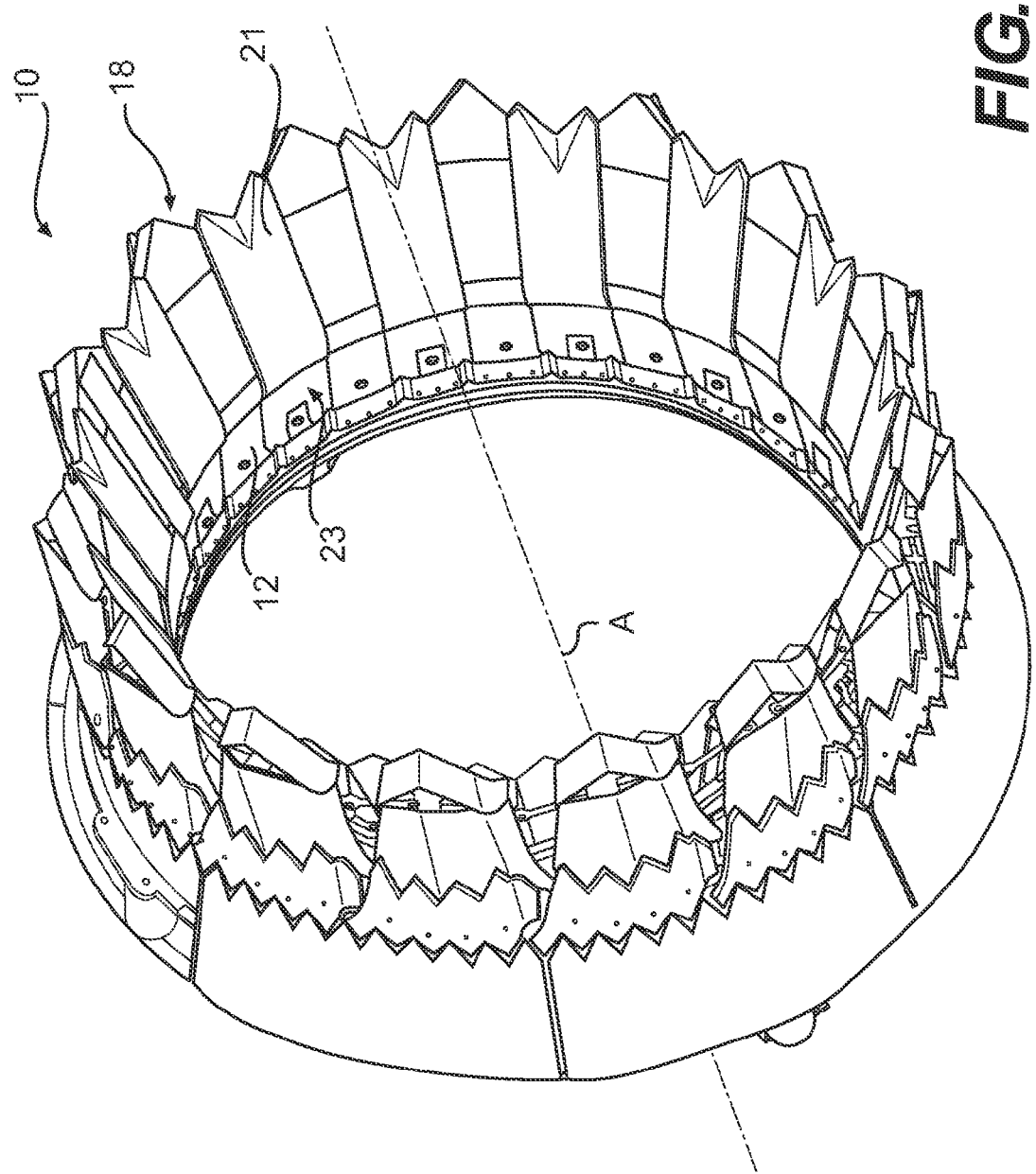
FIG. 1A is a general perspective view of a variable geometry exhaust nozzle of the present invention with the nozzle shown in a maximum position.

FIGS. 1A and 1B illustrate a nozzle system 10 for a gas turbine engine. FIG. 1A depicts the nozzle 10 in a maximum dilated position (also illustrated in FIG. 2A), which is typical during afterburning operation, and FIG. 1B depicts the nozzle system 10 in a minimal dilated position (FIG. 2B), which is typical during non-afterburning operation.

Referring to FIGS. 2A and 2B, the nozzle includes a plurality of circumferentially distributed convergent flaps 12 (only one shown in section), each pivotably connected to a stationary frame 14 having a cooling liner panel 16 upstream thereof. A plurality of circumferentially distributed divergent flaps 18 (only one shown in section) are pivotably connected at a joint structure 20 to an aft end section of the convergent flaps 12.

A plurality of divergent seals 21 (FIGS. 4A and 4B) are each pivotably connected to a respective convergent seal 23 which are respectively distributed circumferentially between each of the divergent flap 18 and convergent flap 12 pairs. Each convergent seal 23 is pivotably connected to the stationary frame 14 with each divergent seal 21 pivotably connected at a joint structure 42 (FIGS. 7A and 7B) adjacent an aft end section of each convergent seal 23.

Taken collectively, the convergent and divergent flaps 12, 18 and the convergent and divergent seals 21, 23 circumscribe the nozzle centerline A to define the radial outer boundary of a combustion gas path F (FIGS. 1A, 1B). During operation, a control system (illustrated schematically) governs the angular orientations of the convergent flaps 12 and divergent flaps 18 to adjust the nozzle throat area 34 and exit area 26 (FIGS. 2A, 2B).

The flaps 12, 18 and seals 21, 23 define a convergent section 30 and a divergent section 32 of the nozzle with the throat area 34 defined therebetween. The throat area 34 is the minimum cross sectional area of the nozzle which when compared to the nozzle exit area 26 defines a nozzle area ratio. The liner panels 16, taken collectively (also illustrated in FIG. 7A), form a liner that cooperates with the convergent flaps 12 and convergent seals 23 to define an annular cooling airflow passageway 28. The passageway 28 guides a cooling airflow (illustrated schematically by arrows C) along an inner surface of the convergent flaps 12 and convergent seals 23. The cooling airflow C is typically sourced from fan bypass airflow and/or other airflow that is different from the exhaust gas flow (illustrated schematically by arrow F). The cooling airflow C at least partially shields the flaps 12, 18 and seals 21, 23 from the intense heat of the exhaust gas flow F.

Figure 3A:
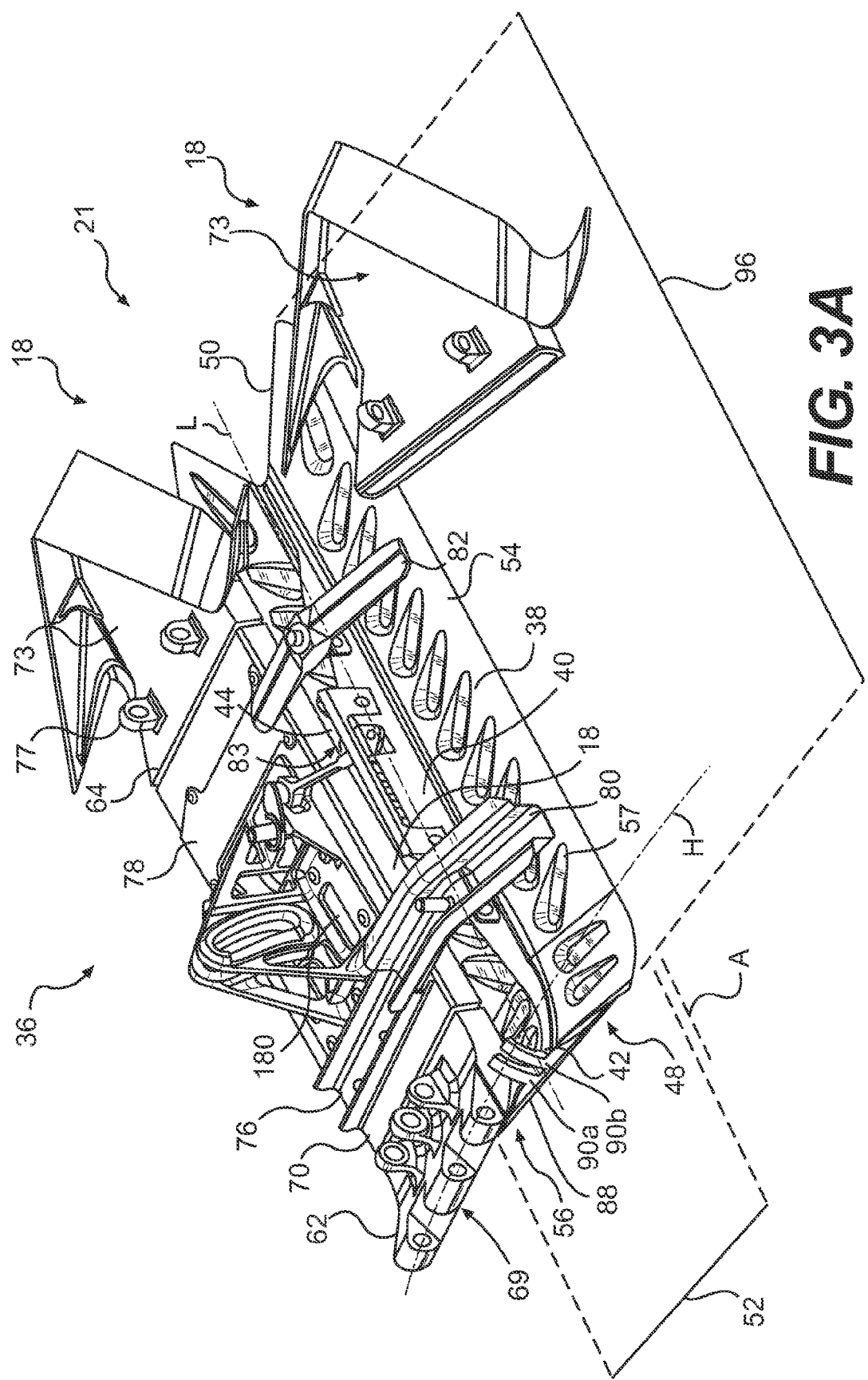
FIG. 3A is a general frontal perspective view of a divergent section of the variable geometry exhaust nozzle from a cold side with an external flap removed shown in a maximum position.

Referring to FIG. 3A, a divergent flap-seal section 36 (also illustrated in FIG. 5) which includes one divergent seal 21 with one divergent flap 18 (the opposite side divergent flap 18 position illustrated by only the plow tip section 73). One divergent flap 18 is located to overlap each divergent seal 21 longitudinal side 54, 56. It should be understood that the flap-seal section 36 as illustrated herein is for descriptive purposes and that the description applies to each adjacent flap 18 and seal 21 defined about the circumference of the nozzle 10. In FIG. 3A, the flap-seal section 36 is illustrated from a "cold-side" opposite the "hot-side" (illustrated in FIGS. 7A and 7B). The "hot-side" of the flap-seal section 36 is directly exposed to the exhaust gases flow which exits the engine. The "cold-side" of the flap-seal section 36 is defined as the side opposite the exhaust gas flow path F.

Each divergent seal 21 generally includes a divergent seal body 38, a spine member 40 along a seal longitudinal axis L, a seal joint structure 42 and a flap position guide 44. The seal joint structure 42 forms a portion of the joint structure 20 that defines a hinge axis H that surrounds the engine centerline A (FIGS. 2A and 2B). The divergent seal body 38 may be described as having a length 46, defined as extending between a forward end section 48 and an aft end section 50; and a width 52 defined between the first longitudinal side 54 and the second longitudinal side 56 (also illustrated in FIG. 5). The divergent seal body 38 is preferably a relatively planar member having a multitude of structural corrugations 57 or the like. Corrugation geometries other than that illustrated may also be utilized with the present invention. The aft end section 50 is preferably of a chevron shape to form a serrated nozzle end (FIGS. 1A and 1B).

Figure 4B:
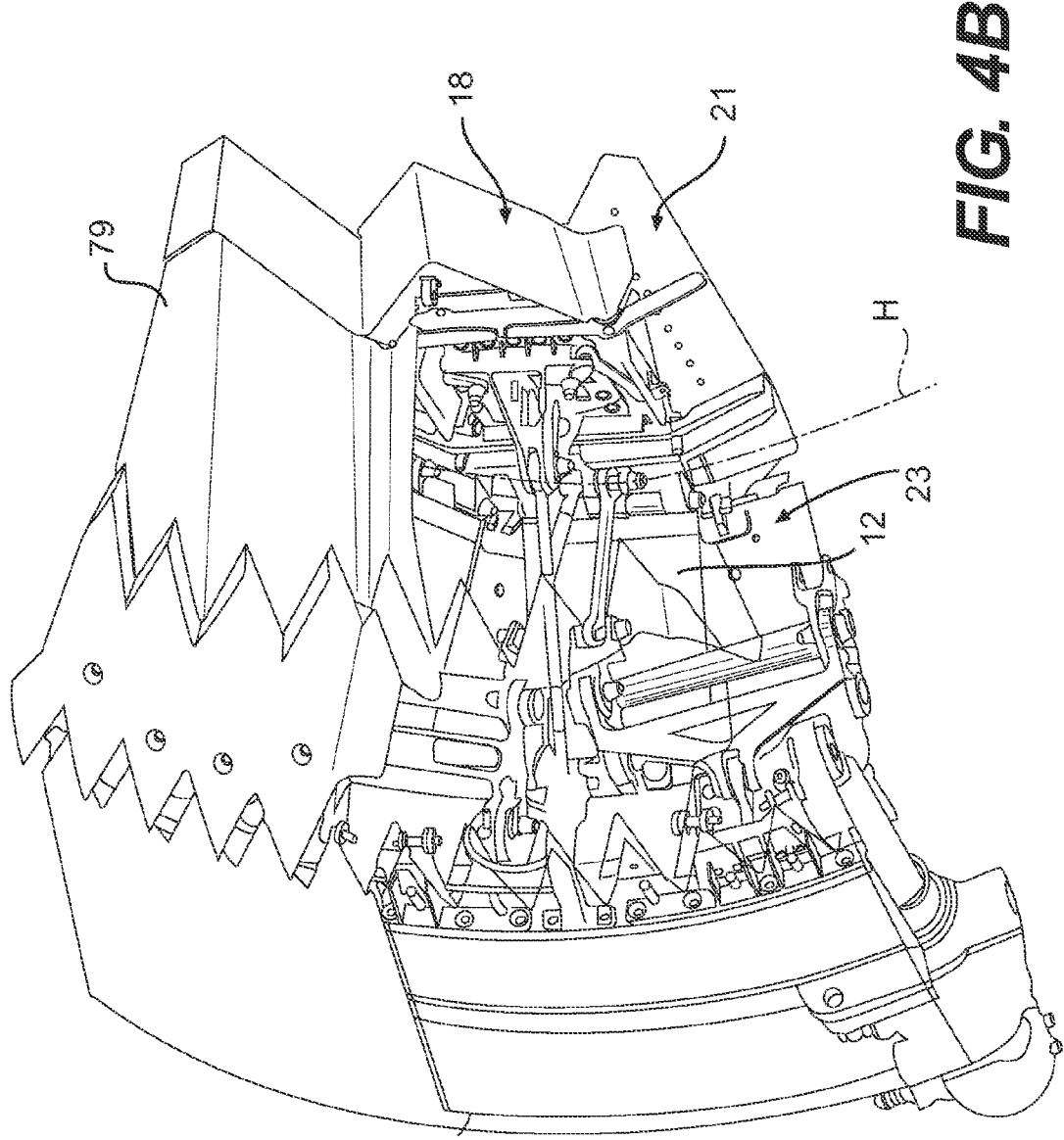
FIG. 4B is a general perspective partial phantom view of a segment of the variable geometry exhaust nozzle of the present invention with the nozzle shown in a minimum position.
Figure 5:
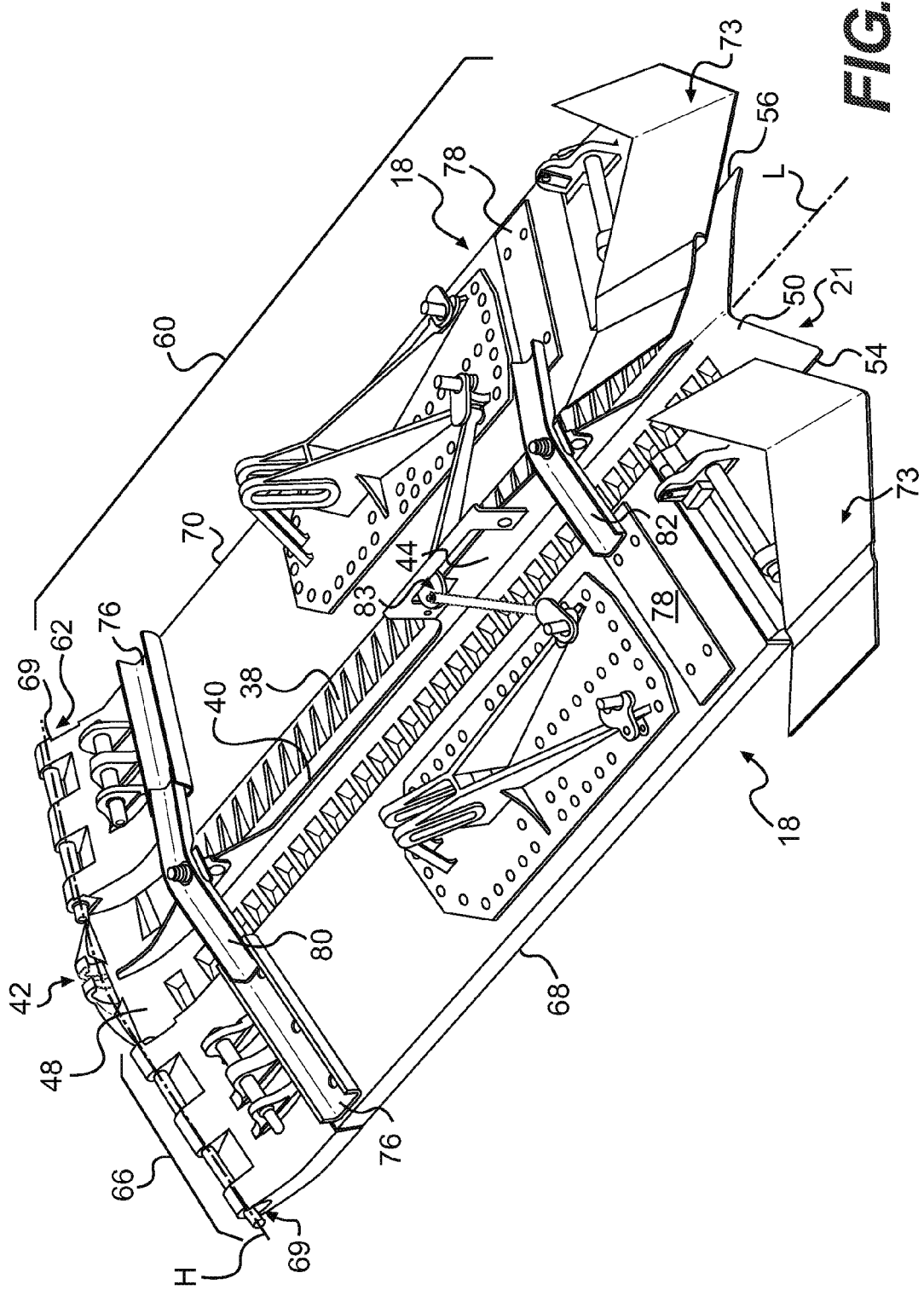
FIG. 5 is a general aft perspective external view of a divergent section of the variable geometry exhaust nozzle.

Each divergent flap 18 may be described as having a divergent flap body 60, defined as extending between a forward end section 62 and an aft end section 64; and a width 66 defined between a first longitudinal side 68 and a second longitudinal side 70 (FIG. 5). The divergent flap body 60 is preferably manufactured of a solid ceramic matrix composite material, but may alternatively be formed as a metallic "cold sheet," "hot sheet" assembly. The forward end section 62 of each divergent flap 18 includes the divergent flap joint structure 69 that forms a portion of the joint structure 20 (FIGS. 2A, 2B). The divergent flap joint structure 69 corresponds with the divergent seal joint structure 42 along the hinge axis H (also illustrated in FIGS. 6A and 6B). The aft end section 64 of each divergent flap 18 includes a plow tip section 73. The plow tip section 73 is preferably chiseled and includes a hinge point 77 for attachment of an external flap 79 (FIGS. 4A and 4B). It should be understood that various plow tip sections planforms and profiles will be usable with the present invention.

Each divergent flap 18 preferably includes a forward bridge support 76 and an aft bridge support 78 which respectively receive a forward seal bridge bracket 80 and an aft seal bridge bracket 82 mounted to the divergent seal 21. The forward seal bridge bracket 80 and the aft seal bridge bracket 82 of the divergent seal 21 respectively engage the forward bridge support 76 and the aft bridge support 78 mounted to the adjacent divergent flaps 18.

The forward seal bridge bracket 80 and the aft seal bridge bracket 82 on the divergent seal 21 bridge the forward bridge support 76 and the aft bridge support 78 of two adjacent divergent flaps 18 to link movement between adjacent divergent flaps 18 and divergent seals 21 around the circumference of the nozzle 10. The interface of the forward seal bridge bracket 80 and the aft seal bridge bracket 82 with the forward bridge support 76 and the aft bridge support 78 provides for axial and radial support for the divergent seal 21 between the adjacent divergent flaps 18. More specifically, the forward seal bridge bracket 80 provides for axial and radial support for the divergent seal 21 between the adjacent divergent flaps 18 while the aft seal bridge bracket 82 need provide only radial support. The combined axial and radial support are provided by the sliding interface between the forward seal bridge bracket 80, the aft seal bridge bracket 82 and the respective forward bridge support 76 and aft bridge support 78 rather than at the hinge line H.

A centering linkage assembly 83 is restrained by the flap position guide 44 to further guide dilation of the nozzle system 10 during articulation between the maximum dilated position and the minimal dilated position to facilitate generally synchronous movement between the divergent flaps 18 and divergent seals 21. It should be understood that various linkages and guides are alternatively or additionally usable with the present invention.

Referring to FIG. 6A, each divergent seal 21 at least partially overlaps the inner side of each adjacent divergent flap 18. Within the interior of the nozzle system 10, the divergent seals 21 form an inner layer within an outer layer defined by the divergent flaps 18 in which a divergent seal 21 overlaps each gap between two adjacent divergent flaps 18 relative the nozzle centerline A.

Figure 3B:
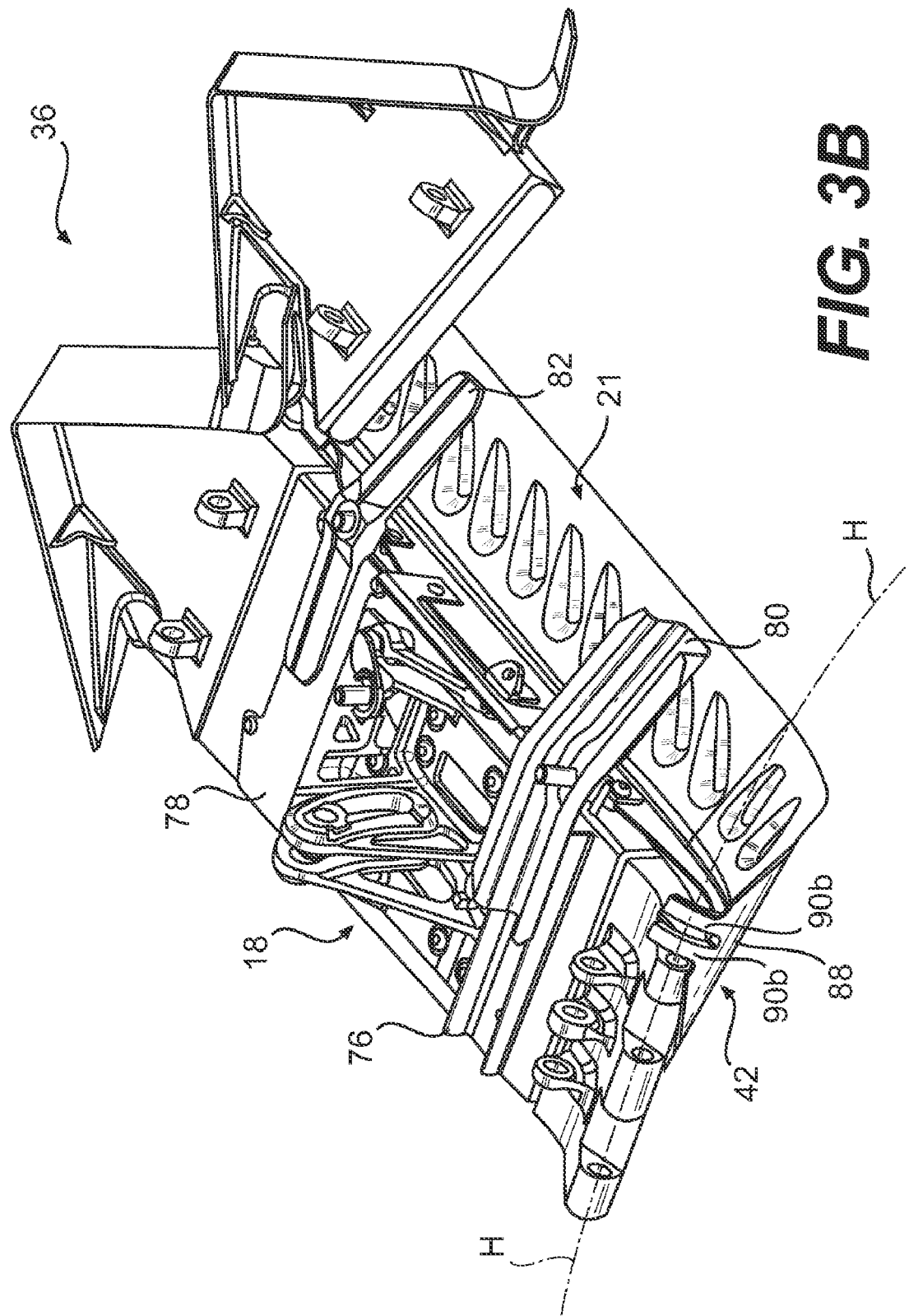
FIG. 3B is a general frontal perspective view of a divergent section of the variable geometry exhaust nozzle from a cold side with an external flap removed shown in a minimum position.

The flap seal joint structure 42 includes a horn 86 and a fork 88. By having the forward bridge bracket retain each divergent seal 21 in the axial direction, there is no need for axial sliding of the divergent seal 21 relative to the divergent flap 18. The horn 86 is mounted adjacent an aft end of the convergent seal 23 (FIG. 6B). The fork 88 is mounted adjacent the forward end section 48 of the divergent seal 21. The fork 88 includes a tine 90a, 90b (FIG. 3B) arranged on either side of the seal longitudinal axis L. The horn 86 extends between the tines 90a, 90b and need only provide circumferential support as the axial and radial support are provided by the sliding interface between the forward seal bridge bracket 80, the aft seal bridge bracket 82 and the respective forward bridge support 76 and aft bridge support 78.

Figure 8A:
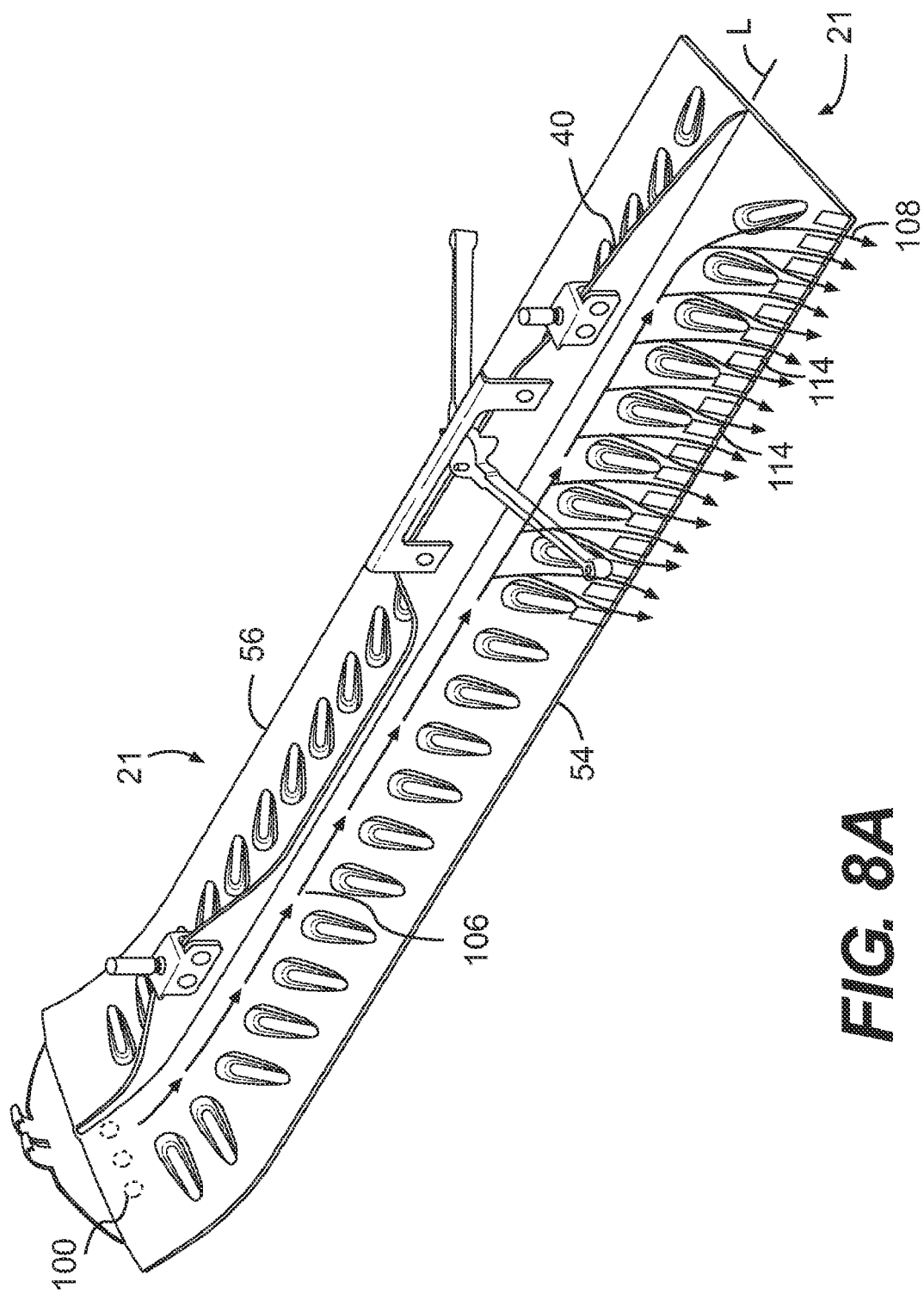
FIG. 8A is a general perspective view of a divergent seal according to the present invention from a "cold" side.

Each divergent seal 21 includes a multiple of divergent seal intakes 100 (also illustrated in FIG. 7) in the forward end section 48 arranged downstream of the hinge axis H to receive a portion of the cooling airflow C. Each divergent seal body 38 is manufactured of a metallic hot sheet inner skin 102 and a metallic cold sheet outer skin 104 (FIG. 7). The skins 102, 104 form a multiple of longitudinal channels 106 therebetween (FIG. 8A). The longitudinal channels 106 (two shown) may at least partially be defined by the spine member 40 along a seal longitudinal axis L (FIG. 7).

Figure 8B:
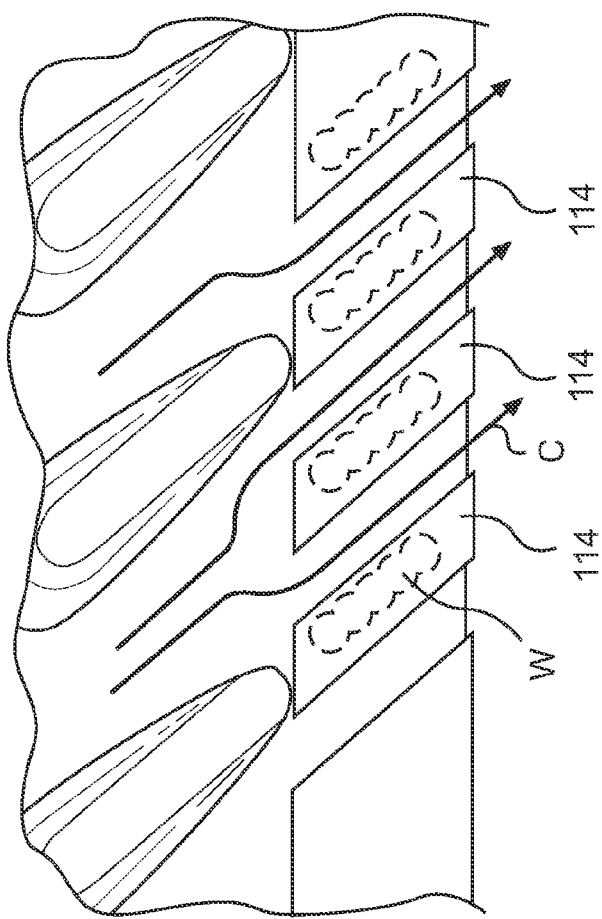
FIG. 8B is an expanded partial phantom perspective view of edge channels within the divergent seal.
Figure 8C:
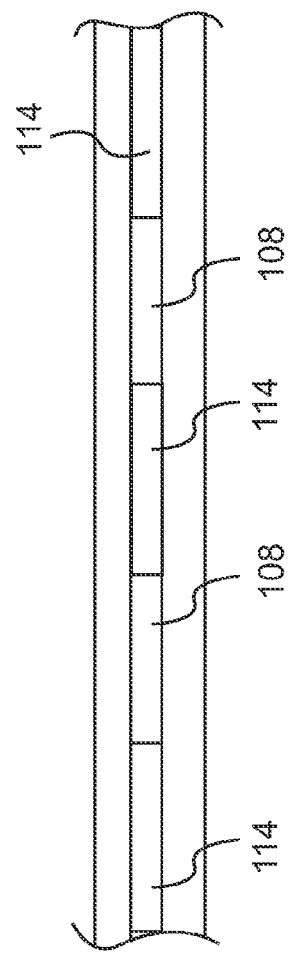
FIG. 8C is an expanded side view of the edge channels.

The longitudinal channels 106 preferably communicate with a multiple of edge channels 108 (FIGS. 8B and 8C) formed within the first longitudinal side 54 and the second longitudinal side 56 of each divergent seal 21. The multiple of edge channels 108 are preferably located transverse to the longitudinal axis L and most preferably are raked aft. It should be understood that the multiple of edge channels 108 may be formed along either or both of the first longitudinal side 54 and the second longitudinal side 56 of each divergent seal 21 as well as raked in other directions and configurations.

The cooling airflow C from the longitudinal channels 106 is communicated through the multiple of edge channels 108 to thereby cool the first longitudinal side 54 (and alternatively or additionally the second longitudinal side 56) of each divergent seal 21 as well as the gas path surface of the adjacent divergent flaps 18. The cooling airflow C may be directed from the edge channels 108 to circumscribe the inner periphery of the nozzle system 10 to further film cool the divergent seals 21 and divergent flaps 18.

Cooling airflow may additionally be communicated through a multiple of surface holes 110 which are typically laser drilled and located through the hot inner skin 102 (FIG. 6A). The surface holes 110 facilitate further cooling of the gas path surface of each divergent seal 21.

Figure 9:
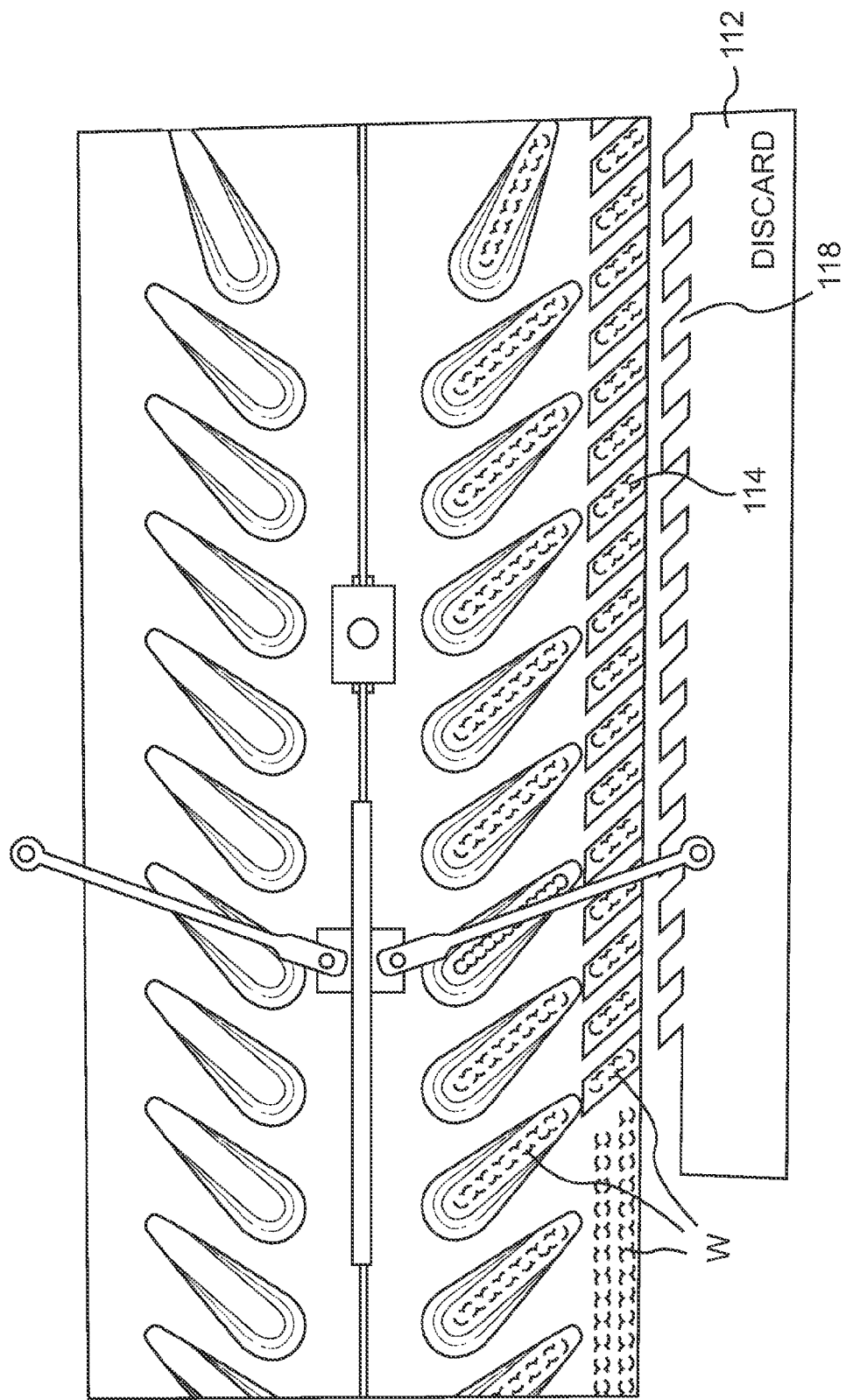
FIG. 9 is a perspective view of the divergent seal being assembled with a spacer comb utilized to form the multiple of edge channels with a multiple of spacer teeth.

Referring to FIG. 9, the divergent seal 21 is preferably manufactured by attaching a spacer comb 112 having a multiple of spacer teeth 114 between the inner skin 102 and the outer skin 104 though spot laser welding at welds W or the like. The spacer comb 112 is preferably attached while the inner skin 102, the outer skin 104 and the longitudinal spline 40 are assembled. Once assembled, the spacer comb 112 is trimmed away to leave the multiple of spacer teeth 114 (FIG. 8C) welded in place to thereby define the multiple of edge channels 108. That is, the spacer teeth 114 separate the inner skin 102 and the outer skin 104 so as to define the edge channels 109 therebetween.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A divergent seal for a convergent/divergent nozzle system comprising:
    a first skin; and
    a second skin having a multiple of intakes arranged downstream of a hinge axis, said second skin attached to said first skin to define a longitudinal cooling airflow channel therebetween, said longitudinal cooling airflow channel in communication with said multiple of intakes and a multiple of edge channels formed between said first skin and said second skin along at least one longitudinal side of said divergent seal, said multiple of edge channels transverse to said longitudinal cooling airflow channel; and
    a joint structure attached to said first skin and said second skin, said joint structure defines said hinge axis, said joint structure includes a fork.

2. The divergent seal as recited in claim 1 wherein said multiple of edge channels are raked aft.

3. The divergent seal as recited in claim 1, wherein said fork includes a tine on each side of a seal longitudinal axis of the divergent seal body.

4. The divergent seal as recited in claim 1, wherein said multiple of intakes are located adjacent said joint structure.

5. The divergent seal as recited in claim 1, further comprising a multiple of spacer teeth between said first skin and said second skin to define said multiple of edge channels.

6. The divergent seal as recited in claim 1, further comprising a spine mounted along a divergent seal longitudinal axis, said spine separating said longitudinal cooling airflow channel into a multiple of longitudinal cooling airflow channels.

7. The divergent seal as recited in claim 6, wherein each of said multiple of longitudinal cooling airflow channels communicates with a multiple of edge channels.

8. The divergent seal as recited in claim 1, wherein said multiple of edge channels are formed on a first and a second longitudinal side of said divergent seal.

9. The divergent seal as recited in claim 1, wherein said multiple of edge channels are transverse to said longitudinal cooling airflow channel, said longitudinal cooling airflow channel defined generally parallel to a divergent seal longitudinal axis.

10. The divergent seal as recited in claim 9, wherein said multiple of edge channels are raked aft.

11. The divergent seal as recited in claim 1, wherein said first skin and said second skin are separated by a multiple of spacer teeth which define said multiple of edge channels between said first skin and said second skin.

12. The divergent seal as recited in claim 1, wherein said first skin and said second skin are separated by a spacer comb to define said multiple of edge channels between said first skin and said second skin.

13. The divergent seal as recited in claim 12, wherein a multiple of spacer teeth of said spacer comb are welded to said first skin and said second skin.

14. A divergent seal for a convergent/divergent nozzle system comprising:
    a first skin; and
    a second skin having a multiple of intakes arranged downstream of a hinge axis, said second skin attached to said first skin to define a longitudinal cooling airflow channel therebetween, said longitudinal cooling airflow channel in communication with said multiple of intakes and a multiple of edge channels formed between said first skin and said second skin along at least one longitudinal side of said divergent seal, said multiple of edge channels transverse to said longitudinal cooling airflow channel, wherein said first skin is a cold sheet and said second skin is a hot sheet, said multiple of intakes through said hot sheet.

15. A divergent seal for a convergent/divergent nozzle system comprising:
   a first skin; and
   a second skin having a multiple of intakes arranged downstream of a hinge axis, said second skin attached to said first skin to define a longitudinal cooling airflow channel therebetween, said longitudinal cooling airflow channel in communication with said multiple of intakes and a multiple of edge channels formed between said first skin and said second skin along at least one longitudinal side of said divergent seal, said multiple of edge channels transverse to said longitudinal cooling airflow channel; and
   a spine mounted along a divergent seal longitudinal axis, said spine defines a flap position guide.

16. A divergent seal for a convergent/divergent nozzle system comprising:
   a first skin; and
   a second skin having a multiple of intakes arranged downstream of a hinge axis, said second skin attached to said first skin to define a longitudinal cooling airflow channel therebetween, said longitudinal cooling airflow channel in communication with said multiple of intakes and a multiple of edge channels formed between said first skin and said second skin along at least one longitudinal side of said divergent seal, said multiple of edge channels transverse to said longitudinal cooling airflow channel; and
   a forward seal bridge bracket and an aft seal bridge bracket mounted transverse to a seal longitudinal axis.

17. The divergent seal as recited in claim 16, wherein a forward seal bridge bracket and an aft seal bridge bracket are mounted to a spine along a seal longitudinal axis, said forward seal bridge bracket and said aft seal bridge bracket arranged transverse to said seal longitudinal axis, said forward bridge support engageable with said forward seal bridge bracket to radially and axially support said divergent seal and said aft bridge support engageable with said aft bridge support to radially support said divergent seal.

18. A divergent seal for a convergent/divergent nozzle system comprising:
   a divergent seal body having a multiple of intakes arranged downstream of a hinge axis, said multiple of intakes communicate with a longitudinal cooling airflow channel within said divergent seal body, said longitudinal cooling airflow channel in communication with a multiple of edge channels along a longitudinal side of said divergent seal body; and
   a joint structure attached to said divergent seal body, said joint structure defines said hinge axis.

19. The divergent seal as recited in claim 18, wherein said multiple of intakes are generally parallel to said hinge axis.

20. The divergent seal as recited in claim 18, wherein said multiple of intakes are located adjacent a forward end section of said divergent seal body, said forward end section includes a radiused surface.

21. The divergent seal as recited in claim 18, further comprising a spine mounted along a divergent seal longitudinal axis, said spine separating said longitudinal cooling airflow channel into a multiple of longitudinal cooling airflow channels.

22. The divergent seal as recited in claim 21, wherein each of said multiple of longitudinal cooling airflow channels communicates with a multiple of edge channels.

23. The divergent seal as recited in claim 22, wherein said multiple of edge channels are formed on a first and a second longitudinal side of said divergent seal between a first skin and a second skin.

24. The divergent seal as recited in claim 18, wherein said divergent seal body is a relatively planar member.

25. A divergent seal for a convergent/divergent nozzle system comprising:
   a divergent seal body having a multiple of intakes arranged downstream of a hinge axis, said multiple of intakes communicate with a longitudinal cooling airflow channel within said divergent seal body, said longitudinal cooling airflow channel in communication with a multiple of edge channels along a longitudinal side of said divergent seal body, wherein said multiple of intakes are located adjacent a forward end section of said divergent seal body, said forward end section includes a radiused surface and an aft end section of said divergent seal body defines a chevron shape.

26. A divergent seal for a convergent/divergent nozzle system comprising:
   a divergent seal body having a multiple of intakes arranged downstream of a hinge axis, said multiple of intakes communicate with a longitudinal cooling airflow channel within said divergent seal body, said longitudinal cooling airflow channel in communication with a multiple of edge channels along a longitudinal side of said divergent seal body; and
   a spine mounted along a divergent seal longitudinal axis, said spine defines a flap position guide.

27. A divergent seal for a convergent/divergent nozzle system comprising:
   a divergent seal body having a multiple of intakes arranged downstream of a hinge axis, said multiple of intakes communicate with a longitudinal cooling airflow channel within said divergent seal body, said longitudinal cooling airflow channel in communication with a multiple of edge channels along a longitudinal side of said divergent seal body, said divergent seal body is a relatively planar member having a multitude of structural corrugations, said divergent seal body formed of a first skin and a second skin.

28. The divergent seal as recited in claim 27, wherein said forward end section of said divergent seal body includes a radiused surface relative to said planar member.

29. A divergent seal for a convergent/divergent nozzle system comprising:
   a first skin; and
   a second skin having a multiple of intakes arranged downstream of a hinge axis, said second skin attached to said first skin to define a longitudinal cooling airflow channel therebetween, said longitudinal cooling airflow channel in communication with said multiple of intakes and a multiple of edge channels formed between said first skin and said second skin along at least one longitudinal side of said divergent seal, said multiple of edge channels transverse to said longitudinal cooling airflow channel, said multiple of intakes are generally parallel to said hinge axis.

* * * * *